UNITED STATES PATENT OFFICE.

CLARA ROZA PADRO, OF SPRINGFIELD, MASSACHUSETTS.

REMEDY FOR CORNS, BUNIONS, &c.

SPECIFICATION forming part of Letters Patent No. 355,552, dated January 4, 1887.

Application filed July 12, 1886. Serial No. 207,794. (No specimens.)

*To all whom it may concern:*

Be it known that I, CLARA ROZA PADRO, a citizen of the United States, residing at Springfield, county of Hampden and State of Massachusetts, have invented a new and useful Composition of Matter to be used as a Medicinal Preparation for the Feet, of which the following is a specification.

My composition consists of the following ingredients, combined in the proportions stated, viz: bicarbonate of potash, forty-two and one-half per cent.; chloride of sodium, forty-two and one-half per cent.; borax, seven per cent.; camphor, six per cent.; alum, two per cent. Total, one hundred. These ingredients are to be thoroughly mixed in a pulverized state, or a strong solution of each is made by dissolving the same in water, and the above-stated proportions of the several solutions are mingled together.

By the aforesaid means the said composition is prepared either in a powdered or in a liquid form.

The said composition of matter constitutes a medicinal preparation to be used on the feet for reducing bunions, softening and removing corns, preventing the feet from swelling, and treating swollen feet, and generally keeping the skin of the latter in a healthy condition.

The aforesaid proportions of bicarbonate of potash, chloride of sodium, borax, and camphor may be slightly varied without producing an essential change in their combined medicinal effect, and in case of feet that are not swollen a larger per cent. of alum may be used, and in some instances the proportion of the latter may be reduced, or it may be omitted entirely, as when the composition is prepared for feet much swollen; but the effect of the alum combined with the other ingredients, in ordinary cases of swollen feet, is beneficial in reducing them to a normal condition.

What I claim, and desire to secure by Letters Patent of the United States, is—

The herein-described composition of matter, to be used as a medicinal preparation for the feet, consisting of bicarbonate of potash, chloride of sodium, borax, camphor, and alum, in about the proportions specified.

CLARA ROZA PADRO.

Witnesses:
H. A. CHAPIN,
G. M. CHAMBERLAIN.